(12) United States Patent
Huang et al.

(10) Patent No.: US 12,301,063 B2
(45) Date of Patent: May 13, 2025

(54) WET AND DRY CAVITY GENERATOR SYSTEMS AND METHODS OF MANUFACTURING THE SAME

(71) Applicant: GE Aviation Systems LLC, Grand Rapids, MI (US)

(72) Inventors: Hao Huang, Troy, OH (US); James Mahle, Vandalia, OH (US); Xiaochuan Jia, Centerville, OH (US)

(73) Assignee: GE Aviation Systems LLC, Grand Rapids, MI (US)

( * ) Notice: Subject to any disclaimer, the term of this patent is extended or adjusted under 35 U.S.C. 154(b) by 0 days.

(21) Appl. No.: 17/961,113

(22) Filed: Oct. 6, 2022

(65) Prior Publication Data

US 2023/0043602 A1    Feb. 9, 2023

Related U.S. Application Data

(62) Division of application No. 16/718,360, filed on Dec. 18, 2019, now Pat. No. 11,489,386.

(51) Int. Cl.
*H02K 9/19*        (2006.01)
*B33Y 80/00*       (2015.01)
(Continued)

(52) U.S. Cl.
CPC .............. *H02K 1/325* (2013.01); *B33Y 80/00* (2014.12); *B64D 41/00* (2013.01); *H02K 1/24* (2013.01);
(Continued)

(58) Field of Classification Search
CPC ..... B22F 3/1055; B23K 9/044; B23K 9/0953; B33Y 10/00; H02K 1/02; H02K 1/16; H02K 1/24; H02K 1/26; H02K 1/28; H02K 1/32; H02K 15/02; H02K 15/10; H02K 15/14; H02K 19/02; H02K 19/16;
(Continued)

(56) References Cited

U.S. PATENT DOCUMENTS 4,190,780 A    2/1980   Whiteley
5,358,379 A   10/1994   Pepperman et al.
(Continued)

FOREIGN PATENT DOCUMENTS

CN    101010516 A    8/2007
CN    102577033 A    7/2012
(Continued)

OTHER PUBLICATIONS

JP-2012165620-A machine translation Mar. 21, 2024.*

*Primary Examiner* — Leda T Pham
(74) *Attorney, Agent, or Firm* — Thomas | Horstemeyer, LLP (57) ABSTRACT

A method for manufacturing a main rotor for a generator is provided. The method includes printing at least part of a rotor shaft by a three-dimensional printing process. The step of printing at least part of the rotor shaft includes printing a plurality of closed outlets and a plurality of open outlets. A rotor core is printed by the three-dimensional printing process. The step of printing the rotor core includes printing a plurality of liquid coolant conduits that extend through the rotor core and fluidly connecting the plurality of liquid coolant conduits to the plurality of closed openings.

17 Claims, 8 Drawing Sheets

(51) Int. Cl.
    *B64D 41/00*         (2006.01)
    *H02K 1/24*          (2006.01)
    *H02K 1/32*          (2006.01)
    *H02K 15/022*      (2025.01)
    *H02K 19/22*       (2006.01)
    *H02K 19/38*       (2006.01)
    *B33Y 10/00*       (2015.01)

(52) U.S. Cl.
    CPC ............. *H02K 9/19* (2013.01); *H02K 15/022* (2013.01); *H02K 19/22* (2013.01); *H02K 19/38* (2013.01); *B33Y 10/00* (2014.12)

(58) Field of Classification Search
    CPC ............ H02K 3/18; H02K 3/527; H02K 5/18; H02K 5/20; H02K 9/19; H02K 9/22
    See application file for complete search history.

(56) References Cited

U.S. PATENT DOCUMENTS

| | | | |
|---|---|---|---|
| 6,091,168 A * | 7/2000 | Halsey | .................... H02K 9/02 |
| | | | 310/58 |
| 8,450,888 B2 | 5/2013 | Shafer et al. | |
| 9,837,868 B2 | 12/2017 | Wirsch, Jr. et al. | |
| 9,985,500 B2 * | 5/2018 | Rippel | .................. H02K 5/203 |
| 10,476,358 B2 | 11/2019 | Huang et al. | |
| 10,523,079 B2 * | 12/2019 | Huang | ..................... H02K 3/52 |
| 10,756,598 B2 | 8/2020 | Shaik et al. | |
| 2003/0030333 A1 * | 2/2003 | Johnsen | ................... H02K 1/32 |
| | | | 310/54 |
| 2016/0149451 A1 | 5/2016 | Teter et al. | |
| 2016/0190878 A1 | 6/2016 | Saari et al. | |
| 2016/0204663 A1 | 7/2016 | Huang et al. | |
| 2017/0063183 A1 | 3/2017 | Shrestha et al. | |
| 2018/0026504 A1 | 1/2018 | Huang et al. | |
| 2018/0112531 A1 | 4/2018 | Abrari | |
| 2018/0200823 A1 * | 7/2018 | Huang | .................. H02K 19/16 |
| 2018/0233977 A1 * | 8/2018 | Volkmuth | .............. H02K 1/325 |
| 2018/0278127 A1 * | 9/2018 | Huang | ................. H02K 7/1823 |
| 2019/0074739 A1 | 3/2019 | Brookes | |
| 2019/0222079 A1 | 7/2019 | Singhal et al. | |

FOREIGN PATENT DOCUMENTS

| | | |
|---|---|---|
| CN | 104143884 B | 4/2017 |
| CN | 107645221 A | 1/2018 |
| CN | 108092432 A | 5/2018 |
| CN | 108306457 A | 7/2018 |
| CN | 109599972 A | 4/2019 |
| CN | 110474498 A | 11/2019 |
| EP | 3567706 A1 | 11/2019 |
| JP | 2008219960 A | 9/2008 |
| JP | 2012165620 A * | 8/2012 |

* cited by examiner

WET AND DRY CAVITY GENERATOR SYSTEMS AND METHODS OF MANUFACTURING THE SAME

CROSS REFERENCE TO RELATED APPLICATION(S)

This application is a divisional of U.S. patent application Ser. No. 16/718,360, filed Dec. 18, 2019, now allowed, which is incorporated herein in its entirety.

FIELD

The present specification generally relates to generator systems and, more specifically, to generator systems and methods for making wet and dry cavity generator systems.

TECHNICAL BACKGROUND

Some current aircraft engines include starter/generator systems that are a motor for starting the aircraft engines and also a generator to provide electrical energy to power systems on the aircraft after starting the aircraft engines. In this regard, the starter/generator systems have a start mode that converts electrical energy into mechanical energy and a generate mode that converts mechanical energy into electrical energy.

Starter/generator systems include a fixed plurality of components and a moving plurality of components that move relative to the fixed plurality of components. The fixed plurality of components include a main stator that includes a housing that provides a cavity therethrough. The moving plurality of components include a main rotor that is located within the cavity that rotates relative to the main stator to induce a voltage within the main stator during the generate mode.

As the main rotor rotates and induces a voltage in the main stator, heat is generated in the cavity. A liquid cooling system may be provided to reduce the heat. The starter/generator systems may be either wet cavity systems or dry cavity systems. In a wet cavity system, the main rotor and main stator are exposed directly to a liquid coolant. In a dry cavity system, the liquid coolant is directed through the cavity within liquid conduits. Both the wet cavity systems and the dry cavity systems have their own advantages and disadvantages.

Conventional methods of forming the starter/generator systems can include any number of manufacturing processes, such as machining, casting etc. For example, oxidized laminations may be stacked to form a core and coils may be formed from insulated wire. Whether the starter/generator systems are either a wet cavity system or a dry cavity system will affect how the starter/generator systems are built. Accordingly, a need exists for other liquid cooling systems and methods of manufacturing the starter/generators with the desired liquid cooling systems, whether wet or dry.

SUMMARY

In one embodiment, a method for manufacturing a main rotor for a generator is provided. The method includes printing at least part of a rotor shaft by a three-dimensional printing process. The step of printing at least part of the rotor shaft includes printing a plurality of closed outlets and a plurality of open outlets. A rotor core is printed by the three-dimensional printing process. The step of printing the rotor core includes printing a plurality of liquid coolant conduits that extend through the rotor core and fluidly connecting the plurality of liquid coolant conduits to the plurality of closed openings.

In another embodiment, a main rotor for a generator system includes a rotor shaft including a plurality of closed outlets printed on an outward-facing circumferential face of the rotor shaft. A plurality of open outlets are printed on the outward-facing circumferential face of the rotor shaft. A rotor core extends about the rotor shaft. The rotor core includes a plurality of liquid coolant conduits printed within the rotor core and fluidly connected with the plurality of closed outlets.

In another embodiment, a generator system includes a main stator and a main rotor located within a cavity of the main stator. The main rotor includes a rotor shaft comprising a plurality of open outlets printed on the outward-facing circumferential face of the rotor shaft. A rotor core extends about the rotor shaft. The rotor core includes a plurality of liquid coolant conduits printed within the rotor core and connected to a closed area of the rotor shaft.

Additional features and advantages of the generator systems described herein, and the components thereof, will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

One embodiment of a generator system includes a main machine including a main stator and a main rotor located in a cavity of the main stator. The rotor includes a shaft that includes closed outlets that are connected to liquid coolant conduits that deliver liquid coolant therethrough in a closed fashion and open outlets that eject liquid coolant directly into the cavity of the main stator in an open fashion. Various embodiments of generator systems, and methods for making the same are described in further detail herein with specific reference to the appended drawings.

In some embodiments, the generator systems described herein may be additively manufactured, such as through a three-dimensional printing process. These additive manufacturing processes can allow the generator systems or components thereof to be formed integrally as a single, monolithic component or as any number of monolithically formed subcomponents. In some embodiments, the components may all be formed from a same material, such as cobalt iron or silicon iron. Additional details of additive manufacturing processes are described in greater detail below.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom, upper, lower,—are made only with reference to the figures as drawn and are not intended to imply absolute orientation unless otherwise expressly stated.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

Reference will now be made to embodiments of a generator system, in particular, an aircraft starter and generator system, and components thereof, examples of which are illustrated in the accompanying drawings. The generator system includes a main stator and a main rotor located in a cavity of the main stator. The rotor includes a shaft that includes closed outlets that are connected to liquid coolant conduits that deliver liquid coolant therethrough in a closed fashion and open outlets that eject liquid coolant directly into the cavity of the main stator in an open fashion. In some embodiments, the generator system may be formed using an additive manufacturing process, where components of the generator system are formed as one or more single, monolithic parts.

Figure 1:
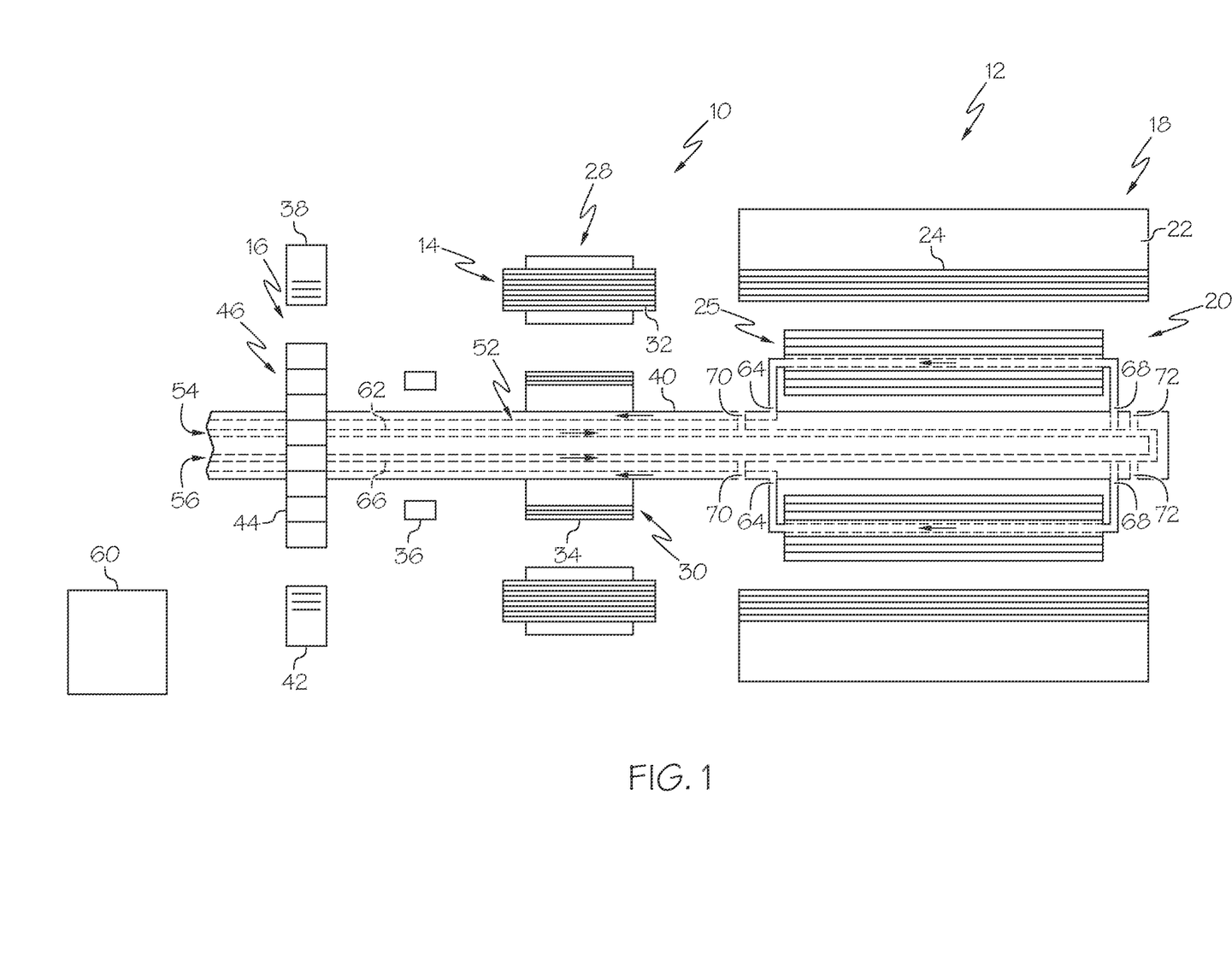
FIG. 1 is a schematic view of a generator system, according to one or more embodiments shown and described herein.

Referring to FIG. 1, a generator system 10 is a combination of three electric machines, including a main machine 12, an exciter 14 and a permanent magnet generator (PMG) 16. The main machine 12 includes a main stator 18 and a main rotor 20 located within a cavity 25 of the main stator 18. The main stator 18 connects to an inverter/converter/controller (ICC) and includes a stator core 22 and a plurality of windings 24 that are wound about pole bodies forming stator poles. The main rotor 20 also includes a plurality of rotor windings 26 that are wound about pole bodies forming rotor poles. Likewise, the exciter 14 includes an exciter stator 28 and an exciter rotor 30. The exciter stator 28 may include a plurality of windings 32 that are wound about pole bodies forming stator poles that connect to the ICC. The exciter rotor 30 may also include a plurality of windings 34 that are wound about pole bodies forming rotor poles where a three-phase AC voltage appears that is rectified by a rectifier 36. The PMG 16 also includes a PMG stator 38 and a PMG rotor 46. The PMG stator 38 may include a plurality of windings 42 that are wound about pole bodies forming stator poles. The PMG rotor 46 may include rotor poles that are formed by permanent magnets 44. The plurality of rotor poles of the main machine 12, exciter 14 and PMG 16 can generate a plurality of magnetic fields relative to the stator poles, such that the generator system 10 can operate through the interaction of magnetic fields and current-carrying conductors to generate force or electric power. The exciter 14 can provide direct current to the main machine 12 and the main machine 12 and PMG 16 can supply AC electrical power when the PMG rotor 46 rotates.

The components of the generator system 10 can be a combination of generators. For example, the main machine 12 can be either a synchronous or asynchronous generator. In addition to the accessories shown in this embodiment, there can be other components that need to be operated for particular applications. For example, in addition to the electromechanical accessories shown, there can be other accessories driven from a same rotor shaft 40 such as a liquid coolant pump, a fluid compressor, or a hydraulic pump.

The generator system 10 can be oil cooled and thus can include a cooling system 52. The cooling oil can be used to dissipate heat generated by the electrical and mechanical functions of the generator system 10. The cooling system 52 can also provide for lubrication of the generator system 10 using oil. In illustrated aspects, the generator system 10 can be configured such that the generator system 10 can operate as both a wet cavity generator and a dry cavity generator simultaneously. The cooling system 52 can include, for example, a cooling fluid reservoir 60 and various cooling passages. The rotor shaft 40 can provide one or more flow channels or paths, including a first flow channel 62 fluidly coupling the rotor shaft 40 with a plurality of closed outlets 64, 68. The rotor shaft 40 may also include a second flow channel 66 fluidly coupling the rotor shaft 40 with the plurality of closed outlets 64, 68. While the flow channels 62 and 66 are illustrated as connected, they may not be. Further the flow channels 62, 66 are merely for illustration and there may be multiple flow channels 62, 66. The first plurality of closed outlets 64 and the second plurality of closed outlets 68 may be axially spaced (e.g. along the longitudinal axis of the rotor shaft 40) and are arranged or disposed on an outward-facing circumferential face of the rotor shaft 40. The first flow channel 62, the flow channel 66, or a combination thereof can enable the flow of cooling fluid, such as oil, for the main rotor 20.

The rotor shaft 40 can also provide a first plurality of open outlets 70 and a second plurality of open outlets 72 in fluid communication with the first and second flow channels 62 and 66 or others of the flow channels. The first plurality of open outlets 70 and the second plurality of open outlets 72 may be axially spaced (e.g. along the longitudinal axis of the rotor shaft 40) and arranged or disposed on an outward-facing circumferential face of the rotor shaft 40. The first plurality of open outlets 70 and the second plurality of open outlets 72 are open in that they allow liquid coolant to be sprayed directly into cavity 25.

Figure 2:
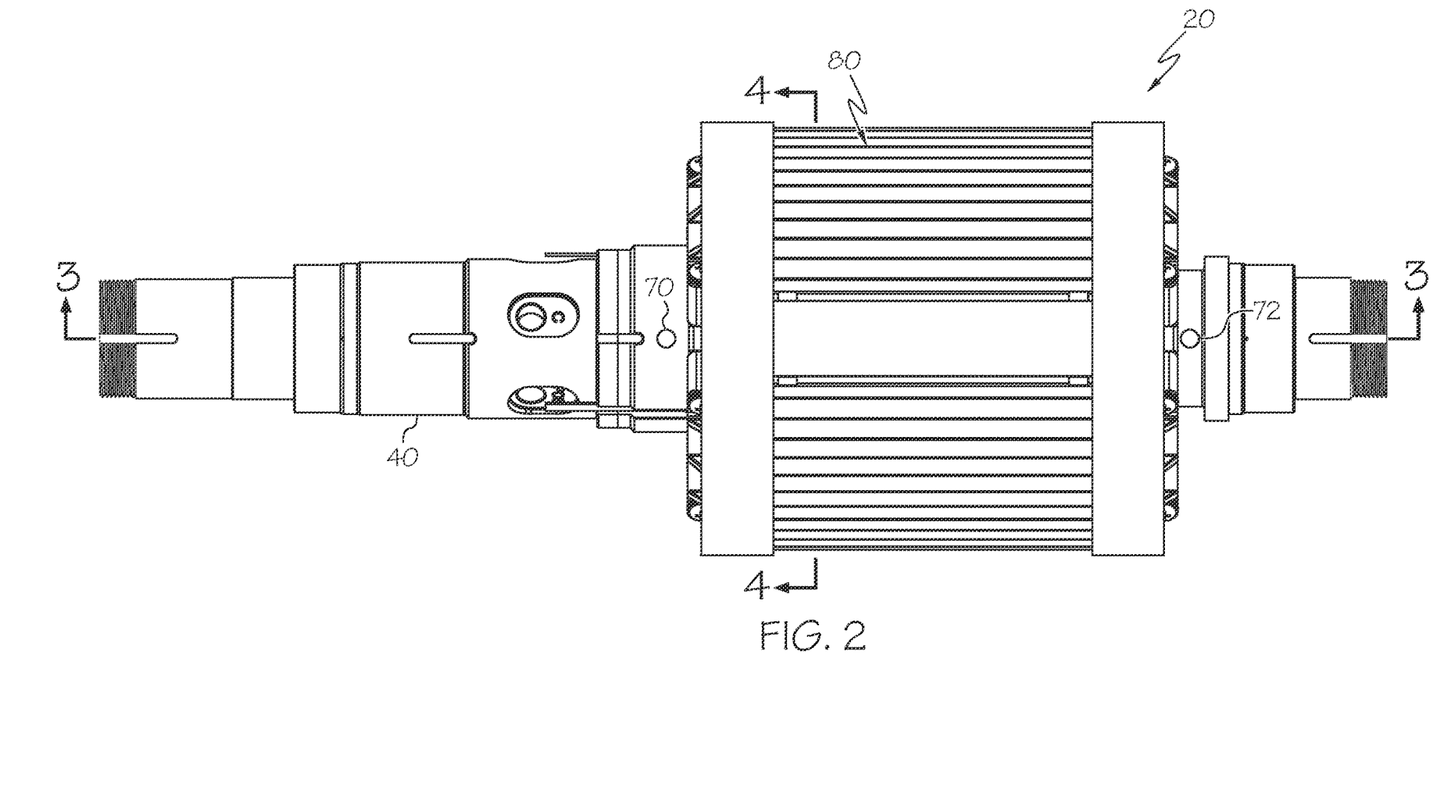
FIG. 2 is a side view of a main rotor for use in the generator system of FIG. 1, according to one or more embodiments shown and described herein.
Figure 3:
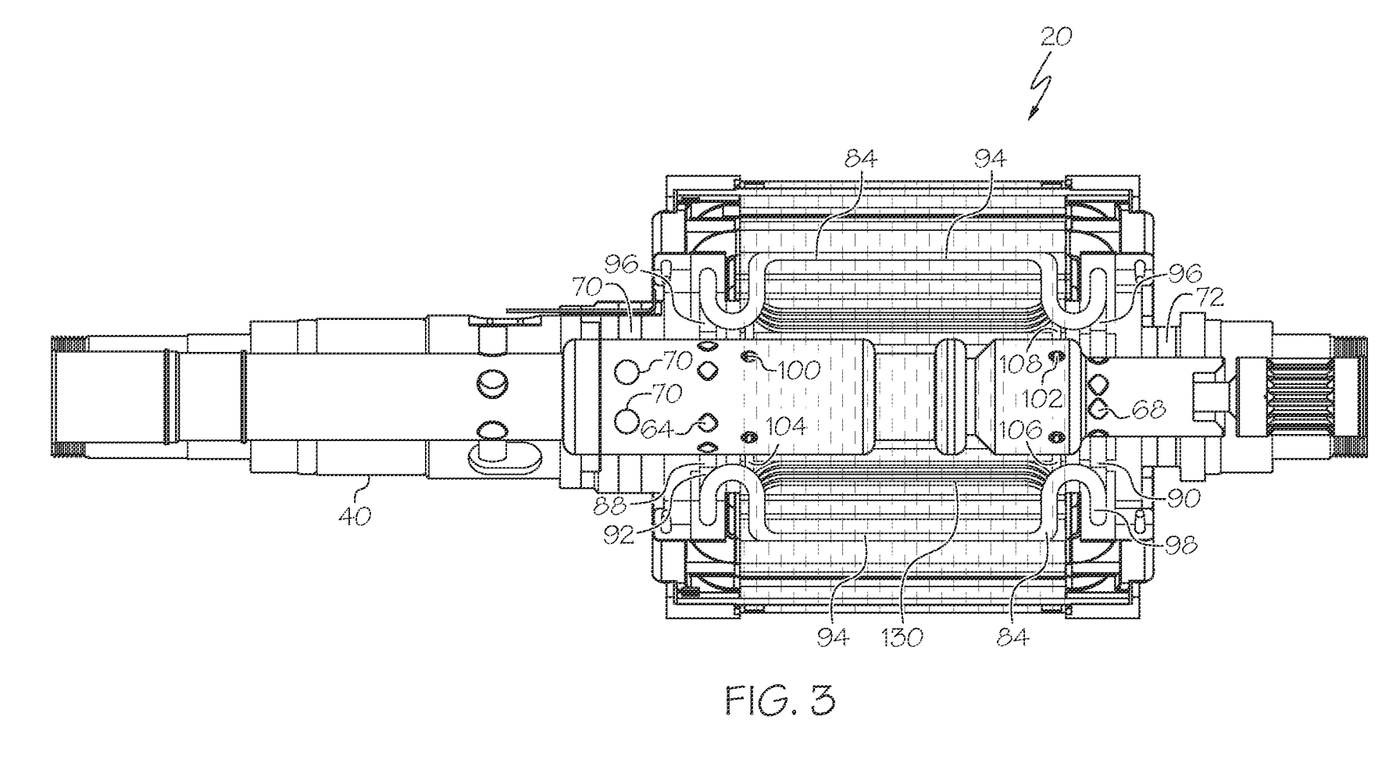
FIG. 3 is a section view of the main rotor along line 3-3 of FIG. 2, according to one or more embodiments shown and described herein.
Figure 4:
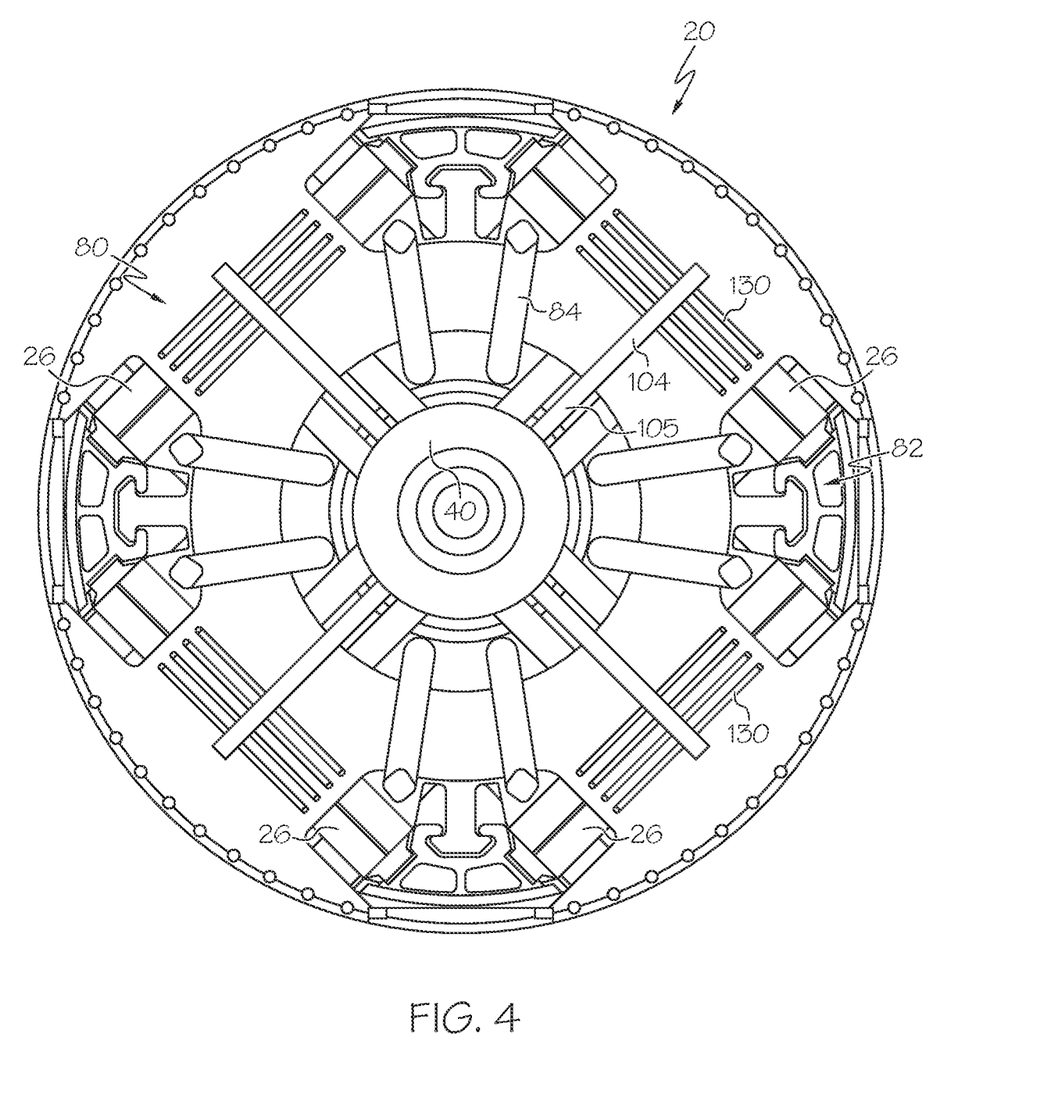
FIG. 4 is a section view of the main rotor along line 4-4 of FIG. 2, according to one or more embodiments shown and described herein.

Referring to FIGS. 2-4, the main rotor 20 is illustrated in isolation and includes the rotor shaft 40 and a rotor core 80. Referring to FIGS. 3 and 4, the rotor windings 26 extend axially along the rotor core 80. The plurality of rotor windings 26 are illustrated schematically in FIG. 4. Multiple sets of rotor windings may be provided in each rotor core slot 82, such as two sets of rotor windings can be stacked within a rotor core slot 82. A layer of insulating material may be used to electrically isolate the layers of windings.

A plurality of liquid coolant conduits 84 extend axially through the rotor core 80. The liquid coolant conduits 84 include a first end 88 that is connected to the first plurality of closed outlets 64 and a second end 90 that is connected to the second plurality of closed outlets 68 thereby defining a closed coolant fluid passage from the first plurality of closed outlets 64 to the second plurality of closed outlets 68. Each liquid coolant conduit 84 has a first radial portion 92 that extends radially outward from the rotor shaft 40 and about a disk-like hub 96 that radially supports the liquid coolant conduit 84. The first radial portion 92 further extends radially outward away from the rotor shaft 40 to place an axial portion 94 proximate the rotor windings 26. The axial portion 94 extends axially along a length of the rotor windings 26 (FIG. 4) to a second radial portion 98. The second radial portion 98 extends radially toward the rotor shaft 40 and then about another hub 96 that radially supports the liquid coolant conduit 84. The second radial portion 98 then extends to the rotor shaft 40 and is fluidly connected to the second plurality of closed outlets 68. The liquid coolant conduits 84 can be in fluid communication with the first plurality of closed outlets 64 and the second plurality of closed outlets 68 to provide the coolant flow path where liquid coolant flows through the rotor shaft 40, through the first flow channel 62 (FIG. 1), through the first plurality of closed outlets 64, into the liquid coolant conduits 84, by the rotor windings 26 and through the second plurality of closed outlets 68. The liquid coolant may then return through the second flow channel 66 to be recycled or removed from the coolant flow (e.g., into a reservoir) or removed from the generator system 10.

Figure 5:
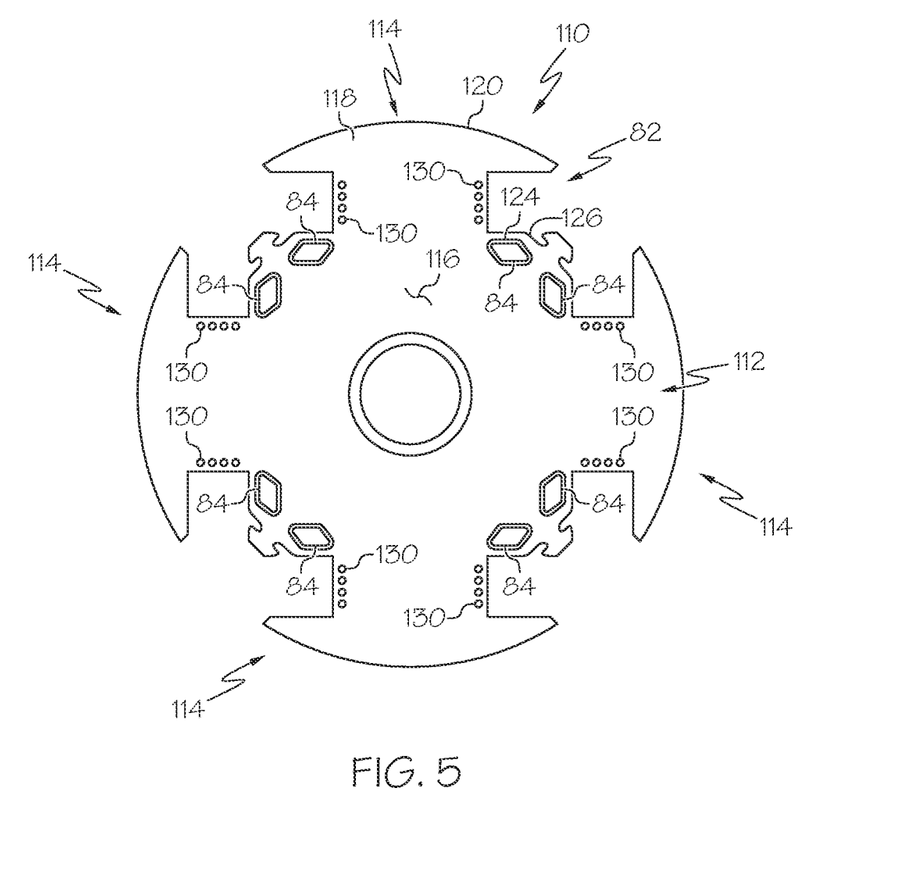
FIG. 5 illustrates a layer of a rotor core of the main rotor of FIG. 2, according to one or more embodiments shown and described herein.

The liquid coolant conduits 84 may be formed in each layer of the rotor core 80 (represented by dashed lines). A layer 110 of the rotor core 80 is illustrated by FIG. 5. The layer 110 may be formed to include a core body 112 that includes a plurality of rotor poles 114 that extend radially outward from a central portion 116. The rotor poles 114 include the pole bodies 118 that extend radially outward from the central portion 116 to respective pole shoes 120. The pole shoes 120 have an enlarged dimension in a circumferential direction compared to the pole bodies 118 and overhang the windings when wound about the pole bodies 118.

In some embodiments, the liquid coolant conduits 84 may be formed of a same material (e.g., an iron-cobalt-vanadium soft magnetic alloy) as the core body 112. The liquid coolant conduits 84 may have any suitable cross-sectional shape, such as round and oblong. Further, the liquid coolant conduits 84 may be positioned alongside rotor slots 82 located between the pole bodies 118. In some embodiments, a wall 124 of the liquid coolant conduits 84 may form a portion of a wall 126 of the rotor slots 122 to facilitate removal of heat from the windings when they are provided in the rotor slots 122.

Referring again to FIG. 3, the rotor shaft 40 further includes the first plurality of open outlets 70 and the second plurality of open outlets 72. In the illustrated example, the first plurality of open outlets 70 are spaced axially from the first set of closed outlets 64 and the second plurality of open outlets 72 are spaced axially from the second plurality of closed outlets 68. In other embodiments, one or both of the first and second plurality of open outlets 70 and 72 may be aligned circumferentially with the respective first and second closed outlets 64 and 68. The liquid coolant flows through the rotor shaft 40, through the first plurality of flow channels 62, through the first plurality of open outlets 70, through the second plurality of open outlets 72 and directly into the cavity 25 (FIG. 1). Any additional liquid coolant can return through the second plurality of flow channels 66 to be recycled or removed from the coolant flow (e.g., into a reservoir) or removed from the generator system 10.

Referring again to FIGS. 3 and 4, in some embodiments, the rotor shaft 40 may also include a third plurality of closed outlets 100 and a fourth plurality of closed outlets 102 in fluid communication with the first and second sets of flow channels 62 and 66. The third plurality of closed outlets 100 and the fourth plurality of closed outlets 102 may be axially spaced (e.g. along the longitudinal axis of the rotor shaft 40) and arranged or disposed on an outward-facing circumferential face of the rotor shaft 40. The third plurality of closed outlets 100 are spaced axially from the first set of closed outlets 64 and the fourth plurality of closed outlets 102 are spaced axially from the second plurality of closed outlets 68. In other embodiments, one or both of the third and fourth pluralities of closed outlets 100 and 102 may be aligned circumferentially with the respective first and second closed outlets 64 and 68.

A second plurality of liquid coolant conduits 104 are fluidly connected at their ends 105 to the third plurality of closed outlets 100 and a third plurality of liquid coolant conduits 106 are fluidly connected at their ends 108 to the fourth plurality of closed outlets 102. A plurality of axially extending liquid conduits 130 span between the liquid coolant conduits 104 and liquid conduits 106 providing multiple, radially-spaced axially extending liquid conduits. Referring again to FIG. 5, as with the liquid coolant conduits 84, the axially extending liquid conduits 130 may be formed in each layer of the rotor core 80.

The above-described main rotor 20 including the open outlets 70 and 72, closed outlets 64, 68, 100 and 102 and liquid coolant conduits 84, 104 and 130 may be formed using an additive manufacturing process. Additive manufacturing processes fabricate three-dimensional structures using three-dimensional (3D) information, such as a three-dimensional computer model, of the component (e.g., the main rotor 20 or parts thereof).

As used herein, the term "three-dimensional structures" and the like refer generally to intended or actually fabricated three-dimensional configurations (e.g., of structural material or materials) that are intended to be used for a particular purpose. Such structures may be, for example, designed with the aid of a computer aided design (CAD) program.

As used herein, the term "two-dimensional structures" and the like refer generally to layers of the three-dimensional structure that when built, one over the other, form the three-dimensional structures. While referred to as "two-dimensional structures," it should be understood that each layer includes an accompanying thickness in a third dimension, albeit the structures have a relatively planar configuration compared to a fused stack of the two-dimensional structures that form the three-dimensional structures.

As used herein, the term "electron beam" refers to any charged particle beam. The sources of a charged particle beam can include an electron gun, a linear actuator, etc.

Various embodiments of the additive manufacturing apparatuses relate to methods for producing three-dimensional objects by layering two-dimensional structures one on the other by powder additive manufacturing, such as using electron beam melting (EBM), selective laser sintering (SLS) and/or selective laser melting (SLM). The use of additive manufacturing processes can allow the main rotor 20 or parts thereof to be formed as a single, monolithic piece of a same material, such as cobalt iron or silicon iron.

Figure 6A:
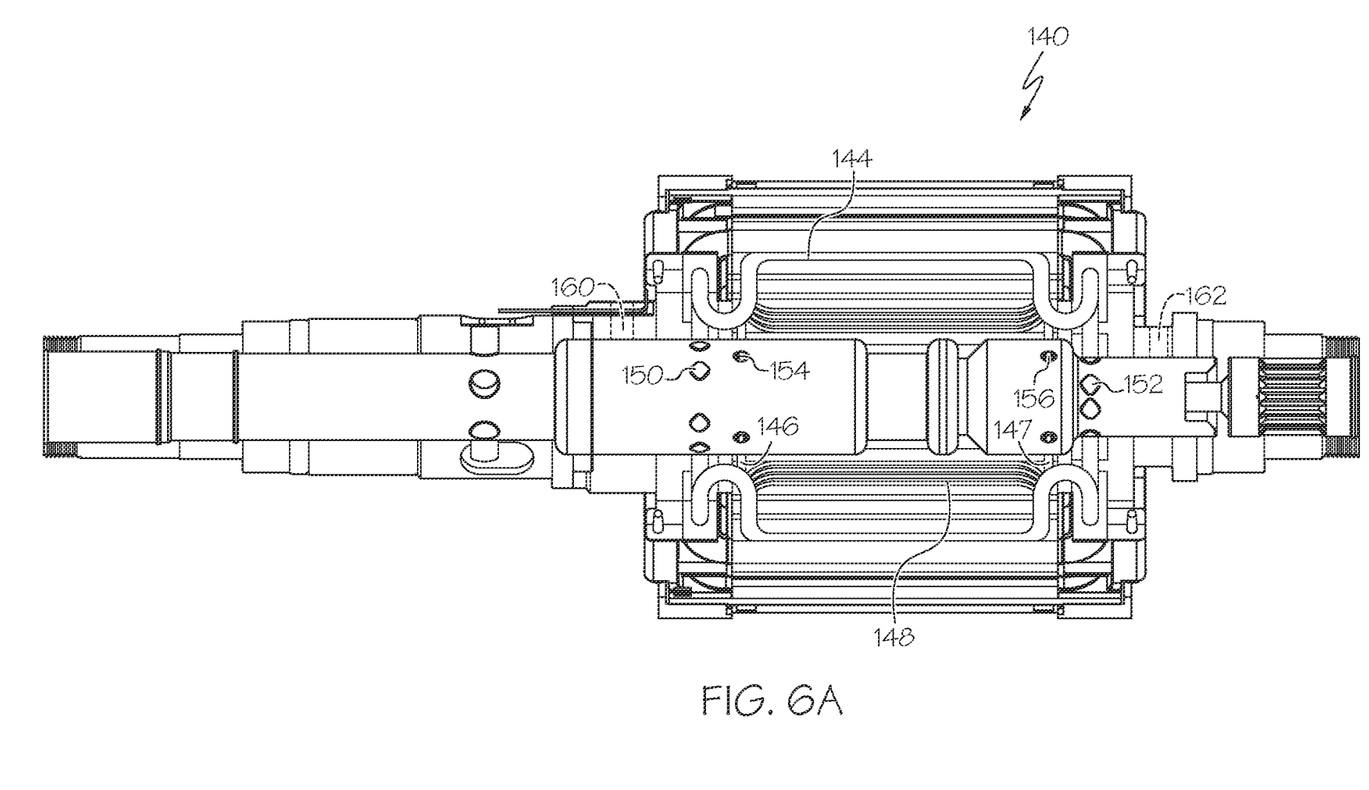
FIG. 6A illustrates another embodiment of a main rotor having a dry configuration, according to one or more embodiments shown and described herein.
Figure 6B:
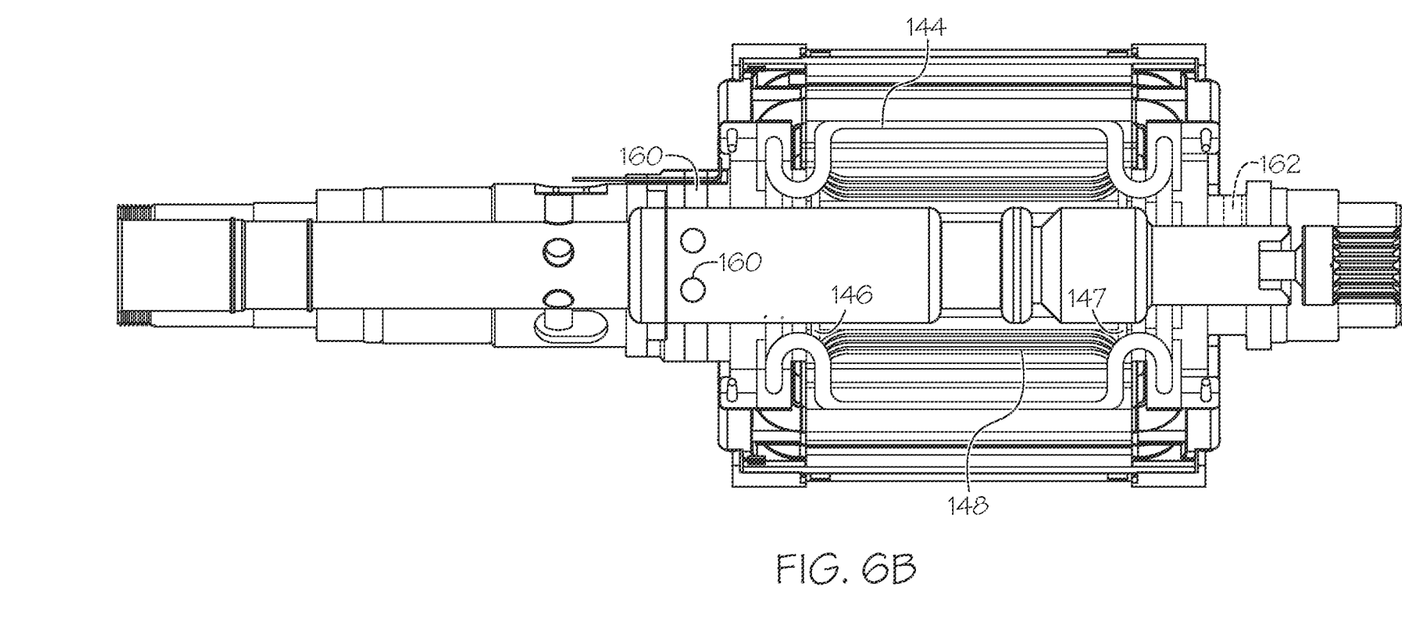
FIG. 6B illustrates another embodiment of a main rotor having a wet configuration, according to one or more embodiments shown and described herein.

Use of additive manufacturing can also allow for rapid changing between main rotor embodiments (e.g., from wet and dry to only dry or to only wet). For example, referring to FIG. 6A, another embodiment of a main rotor 140 includes many of the components described above such as liquid coolant conduits 144, 146, 147 and 148 and closed outlets 150, 152, 154 and 156. In this embodiment, however, the open outlets 70 and 72 of FIG. 3 are not present. In particular, the open outlets 70 and 72 are not printed during the additive manufacturing process effectively capping the open outlets 70 and 72. In other embodiments, referring to FIG. 6B, the liquid coolant conduits 144, 146, 147 and 148 may be printed, but the closed outlets 150, 152, 154 and 156 may not be printed effectively capping the closed outlets 150, 152, 154 and 156 and connecting the liquid coolant conduits 144, 146, 147 and 148 to closed areas (absence of illustrated outlets 150, 152, 154) of the rotor shaft. In these embodiments, the open outlets 160 and 162 may be printed, thus rendering the main rotor 140 a wet cavity machine.

Figure 7:
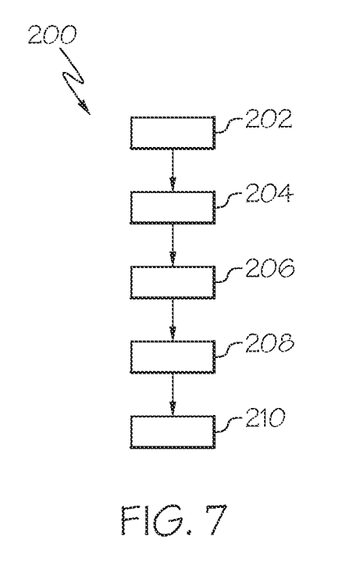
FIG. 7 illustrates a method of manufacturing a main rotor, according to one or more embodiments shown and described herein.

Referring to FIG. 7, a method 200 of printing a main rotor includes selecting a three-dimensional computer model of a desired embodiment of the main rotor at step 202. As examples, the three-dimensional design model may be generated using a computer aided design (CAD) program or three-dimensional scanning a prototype of the main rotor at one or more earlier steps. At step 204, the rotor shaft or at least a portion thereof may be printed. Locations of the rotor shaft may remain unprinted to provide one or both of the closed and open outlets at step 206. In other embodiments, the open or closed outlets may not be printed and may be capped or printed over, referred to as closed areas of the rotor core, depending on the three-dimensional design model selected in the 202. At step 208, the rotor core may be printed. In some embodiments, the rotor core may be printed as a solid core such that the rotor core is a single, monolithic piece. Locations of the rotor core may remain unprinted to provide the liquid coolant conduits at step 210. Because the rotor core and liquid coolant conduits may be formed with the rotor tube, the liquid coolant conduits that are connected to the closed outlets may be formed integrally with the closed outlets and define a perimeter of the closed outlets. In some embodiments where the closed outlets are printed over, the liquid coolant conduits are connected to closed areas of the rotor core.

The above-described generator systems include a main rotor having an interchangeable configuration, for example, between a combination of a wet and dry cavity configuration, a dry cavity configuration and a wet cavity configuration based on selection of a three-dimensional design model that is used in an additive manufacturing process. If a combination wet and dry configuration is desired, the liquid coolant conduits are printed along with the closed outlets and the open outlets in the rotor tube. If a dry cavity configuration is desired, the liquid coolant conduits are printed along with the closed outlets in the rotor tube and the open outlets are not printed. If a wet cavity configuration is desired, the liquid coolant conduits may still be printed but the closed outlets in the rotor tube are not printed. Alternatively, the liquid coolant conduits may not be printed in the wet configuration. The interchangeable main rotors may be used with starter/generators can be used with both shared oil or self-contained oil configurations of accessory gear box (AGB) and aircraft mounted accessory drives (AMAD).

Further aspects of the invention are provided by the subject matter of the following clauses:

1. A method for manufacturing a main rotor for a generator, the method comprising:
   printing at least part of a rotor shaft by a three-dimensional printing process, wherein the step of printing at least part of the rotor shaft comprises printing a plurality of closed outlets and a plurality of open outlets; and printing a rotor core by the three-dimensional printing process, wherein the step of printing the rotor core comprises printing a plurality of liquid coolant conduits that extend through the rotor core and fluidly connecting the plurality of liquid coolant conduits to the plurality of closed openings.

2. The method of any preceding clause, wherein the rotor core comprises a central portion and a plurality of rotor poles that extend radially outward from the central portion.

3. The method of any preceding clause, wherein the plurality of liquid coolant conduits are printed in successive layers of the rotor core within the plurality of rotor poles.

4. The method of any preceding clause, wherein the plurality of rotor poles each comprise a pole body that extends radially outward from the central portion and a pole shoe at an end of the pole body, wherein the plurality of liquid conduits is a first plurality of liquid coolant conduits, the rotor core comprising a second plurality of liquid coolant conduits printed in the successive layers within each pole body.

5. The method of any preceding clause, wherein the open outlets are printed on the rotor tube at a location outside of the rotor core.

6. The method of any preceding clause further comprising selecting one of a combination wet and dry cavity configuration three-dimensional computer model, a wet cavity configuration three-dimensional computer model or a dry cavity configuration three-dimensional computer model.

7. The method of any preceding clause comprising: selecting a dry cavity configuration three-dimensional computer model; printing at least part of another rotor shaft by a three-dimensional printing process, wherein the step of printing at least part of the another rotor shaft comprises printing another plurality of closed outlets without printing at least some open outlets; and printing another rotor core by the three-dimensional printing process, wherein the step of printing the another rotor core comprises printing another plurality of liquid coolant conduits that extend through the another rotor core and fluidly connecting the another plurality of liquid coolant conduits to the another plurality of closed openings.

8. The method of any preceding clause comprising: selecting a dry cavity configuration three-dimensional computer model; printing at least part of another rotor shaft by a three-dimensional printing process, wherein the step of printing at least part of the another rotor shaft comprises printing another plurality of open outlets without printing at least some closed outlets; and printing another rotor core by the three-dimensional printing process, wherein the step of printing the another rotor core comprises printing another plurality of liquid coolant conduits that extend through the another rotor core and connect to a closed area of the rotor shaft.

9. A main rotor for a generator system, the main rotor comprising: a rotor shaft comprising a plurality of open outlets printed on the outward-facing circumferential face of the rotor shaft; and a rotor core that extends about the rotor shaft, the rotor core comprising a plurality of liquid coolant conduits printed within the rotor core and connected to a closed area of the rotor shaft.

10. The main rotor of any preceding clause, wherein the rotor core comprises a central portion and a plurality of rotor poles that extend radially outward from the central portion.

11. The main rotor of any preceding clause, wherein the plurality of liquid coolant conduits are printed in successive layers of the rotor core within the plurality of rotor poles.

12. The main rotor of any preceding clause, wherein the plurality of rotor poles each comprise a pole body that extends radially outward from the central portion and a pole shoe at an end of the pole body, wherein the plurality of liquid conduits is a first plurality of liquid coolant conduits, the rotor core comprising a second plurality of liquid coolant conduits printed in the successive layers within each pole body.

13. The main rotor of any preceding clause further comprising a plurality of windings that are wound about each pole body.

14. The main rotor of any preceding clause, wherein the open outlets are printed on the rotor tube at a location outside of the rotor core.

15. The main rotor of any preceding clause, wherein a flow channel is printed within the rotor shaft that is in fluid communication with at least one of the plurality of closed outlets.

16. A generator system comprising: a main stator; and a main rotor located within a cavity of the main stator, the main rotor comprising: a rotor shaft comprising a plurality of open outlets printed on the outward-facing circumferential face of the rotor shaft; and a rotor core that extends about the rotor shaft, the rotor core comprising a plurality of liquid coolant conduits printed within the rotor core and connected to a closed area of the rotor shaft.

17. The generator system of any preceding clause, wherein the rotor core comprises a central portion and a plurality of rotor poles that extend radially outward from the central portion.

18. The generator system of any preceding clause, wherein the plurality of liquid coolant conduits are printed in successive layers of the rotor core within the plurality of rotor poles.

19. The generator system of any preceding clause, wherein the plurality of rotor poles each comprise a pole body that extends radially outward from the central portion and a pole shoe at an end of the pole body, wherein the plurality of liquid conduits is a first plurality of liquid coolant conduits, the rotor core comprising a second plurality of liquid coolant conduits printed in the successive layers within each pole body.

20. The generator system of any preceding clause, wherein the open outlets are printed on the rotor tube at a location outside of the rotor core.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A main rotor for a generator system, the main rotor comprising:
    a rotor shaft comprising a plurality of open outlets printed on the outward-facing circumferential face of the rotor shaft; and
    a rotor core that extends about the rotor shaft, the rotor core comprising a first plurality of liquid coolant conduits printed within the rotor core and connected to a closed area of the rotor shaft;
    wherein the closed area of the rotor shaft comprises a first, second, third, and fourth plurality of closed outlets that are axially spaced from each other and the plurality of open outlets;
    wherein the rotor core includes a second plurality of liquid coolant conduits fluidly connected to the third plurality of closed outlets, and a third plurality of liquid coolant conduits fluidly connected to the fourth plurality of closed outlets;
    wherein the rotor core includes a plurality of axially extending liquid conduits that span between the second plurality of liquid coolant conduits and the third plurality of liquid coolant conduits; and
    wherein the plurality of axially extending liquid conduits are disposed in a radially-spaced configuration.

2. The main rotor of claim 1, wherein the rotor core comprises a central portion and a plurality of rotor poles that extend radially outward from the central portion; and
    wherein the first plurality of liquid coolant conduits are printed in successive layers of the rotor core within the plurality of rotor poles.

3. The main rotor of claim 2, wherein the plurality of rotor poles each comprise a pole body that extends radially outward from the central portion and a pole shoe at an end of the pole body, and
    wherein the second plurality of liquid coolant conduits are printed in the successive layers within each pole body.

4. The main rotor of claim 3, further comprising a plurality of windings that are wound about each pole body.

5. The main rotor of claim 1, wherein the open outlets are printed on the rotor shaft at a location outside of the rotor core.

6. The main rotor of claim 1, wherein a flow channel is printed within the rotor shaft that is in fluid communication with at least one of the plurality of open outlets.

7. A generator system comprising:
a main stator; and
a main rotor located within a cavity of the main stator, the main rotor comprising:
  a rotor shaft comprising a plurality of open outlets printed on the outward-facing circumferential face of the rotor shaft; and
  a rotor core that extends about the rotor shaft, the rotor core comprising a first plurality of liquid coolant conduits printed within the rotor core and connected to a closed area of the rotor shaft;
wherein the closed area of the rotor shaft comprises a first, second, third, and fourth plurality of closed outlets that are axially spaced from each other and the plurality of open outlets;
wherein the rotor core includes a second plurality of liquid coolant conduits fluidly connected to the third plurality of closed outlets, and a third plurality of liquid coolant conduits fluidly connected to the fourth plurality of closed outlets;
wherein the rotor core includes a plurality of axially extending liquid conduits that span between the second plurality of liquid coolant conduits and the third plurality of liquid coolant conduits; and
wherein the plurality of axially extending liquid conduits are disposed in a radially-spaced configuration.

8. The generator system of claim 7, wherein the rotor core comprises a central portion and a plurality of rotor poles that extend radially outward from the central portion.

9. The generator system of claim 8, wherein the first plurality of liquid coolant conduits are printed in successive layers of the rotor core within the plurality of rotor poles.

10. The generator system of claim 9, wherein the plurality of rotor poles each comprise a pole body that extends radially outward from the central portion and a pole shoe at an end of the pole body, and wherein the second plurality of liquid coolant conduits are printed in the successive layers within each pole body.

11. The generator system of claim 7, wherein the plurality of open outlets are printed on the rotor shaft at a location outside of the rotor core to emit fluid into the cavity.

12. The main rotor of claim 1, wherein the first plurality of liquid coolant conduits comprises two separate liquid cooling circuits that are independent from each other.

13. The main rotor of claim 1, wherein the rotor core includes rotor poles and rotor slots between the rotor poles; and
wherein a wall of at least one liquid coolant conduit of the first plurality of liquid coolant conduits forms a portion of a rotor slot wall of at least one of the rotor slots.

14. The main rotor of claim 1, wherein at least one liquid coolant conduit of the first plurality of liquid coolant conduits includes a first radial portion, a second radial portion, and an axial portion connected between the first radial portion and the second radial portion.

15. The main rotor of claim 14,
wherein the first radial portion is in fluid communication with a first closed outlet of the first plurality of closed outlets; and
wherein the second radial portion is in fluid communication with a second closed outlet of the second plurality of closed outlets.

16. The main rotor of claim 15, wherein the rotor shaft comprises a first flow channel in fluid communication with the first closed outlet, and a second flow channel in fluid communication with the second closed outlet; and
wherein a coolant flow path extends from the first flow channel to the first closed outlet, through the first closed outlet to the first radial portion, through the first radial portion to the axial portion, through the axial portion to the second radial portion, through the second radial portion to the second closed outlet, and through the second closed outlet into the second flow channel.

17. The main rotor of claim 1, wherein the plurality of open outlets are printed on the rotor shaft at a location outside of and axially offset from the rotor core such that the plurality of open outlets do not overlap with the rotor core in a radial direction.

* * * * *